(12) United States Patent
Ravishankar

(10) Patent No.: US 7,943,711 B2
(45) Date of Patent: May 17, 2011

(54) ETHYLENE ELASTOMER COMPOSITIONS

(75) Inventor: Periagaram Srinivasan Ravishankar, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 770 days.

(21) Appl. No.: 11/803,400

(22) Filed: May 14, 2007

(65) Prior Publication Data

US 2008/0287620 A1 Nov. 20, 2008

(51) Int. Cl.
*C08F 4/62* (2006.01)
*C08F 4/6392* (2006.01)
*C08F 4/64* (2006.01)
*C08F 4/646* (2006.01)
*C08F 4/6592* (2006.01)

(52) U.S. Cl. ........ 526/116; 526/114; 526/160; 526/348; 526/943; 525/232; 525/240

(58) Field of Classification Search .................. 526/133, 526/134, 160, 339, 114, 116, 348, 943; 525/232, 525/240
See application file for complete search history.

(56) References Cited

U.S. PATENT DOCUMENTS

| | | | |
|---|---|---|---|
| 5,350,817 A * | 9/1994 | Winter et al. | 526/119 |
| 5,907,021 A | 5/1999 | Turner et al. | |
| 6,096,849 A | 8/2000 | Chung et al. | 526/336 |
| 6,207,756 B1 | 3/2001 | Datta et al. | 525/191 |
| 6,245,856 B1 | 6/2001 | Kaufman et al. | |
| 6,319,998 B1 | 11/2001 | Cozewith et al. | 526/65 |
| 6,635,705 B2 * | 10/2003 | Itoh et al. | 524/525 |
| 6,806,336 B2 | 10/2004 | Ravishankar | 526/284 |
| 7,135,533 B2 | 11/2006 | Ravishankar | 526/282 |
| 7,619,047 B2 * | 11/2009 | Yang et al. | 526/116 |

FOREIGN PATENT DOCUMENTS

| | | |
|---|---|---|
| EP | 0 751 156 | 1/1997 |
| EP | 1 065 241 | 1/2001 |
| EP | 1 152 016 | 11/2001 |
| JP | 2004-143434 | 5/2004 |
| JP | 2004-143437 | 5/2004 |
| WO | WO 96/04290 | 2/1996 |
| WO | WO 97/38019 | 10/1997 |
| WO | WO 2005/049670 | 6/2005 |

* cited by examiner

*Primary Examiner* — Caixia Lu
(74) *Attorney, Agent, or Firm* — Kevin M. Faulkner

(57) ABSTRACT

In a process for producing an elastomer composition, ethylene, at least one alpha-olefin, and at least one diene is contacted with a catalyst system comprising at least two metallocene catalyst compounds and a non-coordinating anion activator wherein one of the metallocene catalyst compounds is an indenyl complex having the general formula: $(In^1R^1_m)R^3(In^2R^2_p)MX_q$, and at least one metallocene catalyst compound comprises a compound having the general formula:

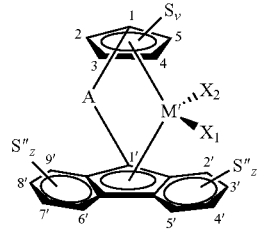

wherein M is a transition metal from Group 3, 4, or 5 of the Periodic Table of the Elements and other deatures defined herein.

9 Claims, No Drawings

ETHYLENE ELASTOMER COMPOSITIONS

FIELD

This invention relates to ethylene elastomer compositions.

BACKGROUND

Ethylene elastomer compositions typically contain ethylene, an alpha-olefin such as propylene, and a third component, such as a diene, to facilitate vulcanization. The choice of the third component can greatly influence the nature of branching reactions and the resultant molecular architecture of the polymer. For example, when ethylidene norbornene (ENB) is used as the diene, as is frequently the case, long chain branching through the diene is facilitated through cationic coupling reactions in Ziegler-Natta (Z-N) polymerization, whereas this branching mechanism is not present with metallocene catalysts. The lack of branching found with metallocene-catalyzed polymerization of ENB is due to the absence of Lewis acidity in Z-N catalyst systems that leads to cationic coupling of the pendent double bonds on the ENB molecule.

When other dienes, such as divinyl benzene (DVB) and vinyl norbornene (VNB) are used in place of ENB in the production of ethylene elastomers, the resultant polymers frequently exhibit improved properties, such as enhanced vulcanization characteristics and the ability to undergo cross-linking with peroxides. However, when using metallocene-catalyzed polymerization with dienes, such as DVB and VNB, incorporation of the pendent double bonds into the polymer backbone is facile and leads to excessive amounts of branching and gel formation. Thus, ethylene elastomers containing VNB are generally synthesized using Ziegler-Natta catalysts. However, the resultant polymers still typically retain a high level of long chain branching which, while helpful for processability, may lower the cure rate and degree of curing during subsequent processing of the polymer. There is therefore significant interest in developing a metallocene-catalyzed polymerization process that will allow the production of ethylene elastomers using dienes, such as DVB and VNB, without, or with reduced, gel formation.

Recently, a class of propylene/ethylene copolymers have been commercialized that comprise 5 to 25% by weight of ethylene-derived units and 95 to 75% by weight of propylene-derived units and that contain isotactic propylene sequences through the use of a particular type of metallocene catalyst. These copolymers have shown an attractive balance of flexural modulus, tensile strength and elasticity and should produce useful elastomer compositions when combined with a diene such as VNB. However, the metallocene catalysts used in the synthesis of these copolymers are known to be potent gel producers in the presence of dienes such as VNB, and so it would be desirable to develop a process for producing elastomer compositions based on these propylene/ethylene copolymers in which the problem of gel formation is obviated or minimized.

U.S. Pat. No. 6,096,849 discloses a process for preparing a linear, homogeneous ethylene/alpha-olefin/VNB copolymer in the presence of a single site metallocene catalyst having the structural formula:

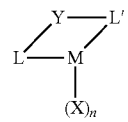

wherein M is a transition metal selected from the group consisting of Group 3 and Group 4 metals of the Periodic Table of the Elements; wherein L and L', independently, are selected from —NR'—, —PR'—, cyclopentadienyl and substituted cyclopentadienyl groups bound in an $\eta^5$ bonding mode to said metal M; wherein at least one of L and L' is a cyclopentadienyl or substituted cyclopentadienyl group; wherein Y is a moiety selected from —SiR$_2$'—, —CR$_2$'—, and —CR$_2$'—CR$_2$'—; wherein R', independently, is selected from hydrogen, alkyl, aryl, silyl, halogeneated alkyl, halogenated aryl, and mixtures thereof, wherein X is selected from hydride, halo, alkyl, aryl, aryloxy, and alkoxy; wherein n is 0, 1 or 2; and wherein the angle formed at the metal center between two L and L' ligands is between 135 and 105°. Exemplified metallocene catalysts include ethyldiindenylzirconium dichloride, dicyclopentadienylzirconium dichloride, and dicyclopentadienyldimethylsilyl-t-butyl aminotitanium dichloride.

U.S. Pat. No. 6,207,756 discloses a method of making an intimate dispersion having a semicrystalline plastic (SP) component and an amorphous elastomer (AE) component, wherein the method comprises: a) feeding solvent and a first set of monomers in predetermined proportions to a first reactor, b) adding a soluble metallocene catalyst to said first reactor, c) polymerizing the first set of monomers in solution to produce an effluent containing a first polymer, d) feeding the effluent to a second reactor, e) feeding a second set of monomers in predetermined proportions to a second reactor with optionally additional solvent and catalyst, and f) polymerizing the second set of monomers in solution in the presence of the first polymer to produce a second polymer wherein: 1) the first and second set of monomers are chosen from the group ethylene, alpha-olefin, non-conjugated diene, 2) one of the two polymers is an SP having a melting point greater than 60° C., 3) the other polymer is an AE copolymer with 20-70 wt. % ethylene and having a melting point less than 60° C., 4) the first polymer contains less than 0.2 vinyl groups per chain, and 5) the first and second polymer are incompatible and form a two phase mixture. Suitable metallocene catalysts include bridged bisindenyl compounds selected from μ-(CH$_3$)$_2$Si(indenyl)$_2$M(Cl)$_2$, μ-(CH$_3$)$_2$Si(indenyl)$_2$M(CH$_3$)$_2$, μ-(CH$_3$)$_2$Si(tetrahydroindenyl)$_2$M(Cl)$_2$, μ-(CH$_3$)$_2$Si(tetrahydroindenyl)$_2$M(CH$_3$)$_2$, μ-(CH$_3$)$_2$Si(tetrahydroindenyl)$_2$M(CH$_2$CH$_3$)$_2$, and μ-(C$_6$H$_5$)$_2$Si(indenyl)$_2$M(CH$_3$)$_2$; wherein M is chosen from a group consisting of Zr, Hf, and Ti.

U.S. Pat. No. 6,319,998 discloses a method of making a copolymer blend by solution polymerization comprising: (a) feeding a first set of at least two different monomers and a solvent in controlled proportions to a first continuous flow stirred tank reactor; (b) adding a metallocene catalyst to the first reactor; (c) operating the first reactor to polymerize the first set of monomers to produce an effluent containing a first copolymer; (d) feeding the effluent of (c) to a second continuous flow stirred tank reactor; (e) feeding a second set of at least two different monomers in controlled proportions to the second reactor and optionally additional solvent; and (f) operating the second reactor to polymerize the second set of monomers to produce a second copolymer, wherein the monomers of the first and second set of monomers are selected from the group consisting of ethylene, higher alpha-olefins and non-conjugated dienes and wherein the monomer proportions in the first reactor and the second reactor are controlled so that the first copolymer has 0 to 85 wt % ethylene, the second copolymer has 0 to 85 wt % ethylene, and the copolymer blend has 6 to 85 wt % ethylene; and wherein 50-100 wt % of the total amount of catalyst added to all reactors is added to the first reactor. Suitable metallocene catalysts include μ-$(CH_3)_2$Si(indenyl)$_2$ Hf$(CH_3)_2$, μ-$(CH_3)_2$Si[tetramethylcyclopentadienyl][adamantylamido]Ti $(CH_3)_2$, and μ-$(C_6H_5)_2$Si[cyclopentadienyl][flourenyl]Hf $(CH_3)_2$.

U.S. Pat. No. 6,806,336 describes a process for solution polymerizing ethylene, propylene and diene having two polymerizable double bonds which comprises: A) reacting in a first step ethylene, propylene and optionally one or more dienes to produce a polymer composition comprising from 0 to less than 1 mol % of diene having two polymerizable double bonds, in the presence of a vanadium based catalyst system; B) reacting in a second step ethylene, higher alpha-olefin comonomer and diene comprising vinyl norbornene in the presence of the same catalyst system, the amount of vinyl norbornene added in the second step being more than 50% a of the total diene added in the first and second step combined; and C) recovering a polymer product having from 0.1 to 0.5 mol % of units derived from vinyl norbornene and a total of no more than 5 mol % diene derived units, from 50 to 90 mol % ethylene derived units, and a balance of propylene derived units.

U.S. Pat. No. 7,135,533 discloses a polymer product which comprises in combination: a) from 50 to 90 mol % of ethylene derived units; b) from 0.1 to 2 mol % of vinyl norbornene (VNB) derived units; c) a balance of higher alpha olefin derived units; d) a branching index of greater than 0.7; and e) an optional amount of ethylidene norbornene (ENB) derived units but less than the amount of VNB.

International Patent Publication No. WO2005/049670 discloses an elastomer comprising: (a) propylene-derived units in an amount of at least 60 wt %, based on the combined weight of components (a), (b), and (c); (b) diene-derived units in an amount within the range of from 0.3 to 10 wt %, based on the combined weight of components (a), (b), and (c); and (c) ethylene-derived units in an amount of at least 6 wt %, based on the combined weight of components (a), (b), and (c); wherein the elastomer has isotactic polypropylene crystallinity, a melting point by DSC equal to or less than 110° C., and a heat of fusion of from 5 J/g to 50 J/g.

In our co-pending, now issued U.S. Pat. No. 7,511,106, we have described a process for producing an ethylene elastomer without the production of gel using VNB as the diene and a specific metallocene catalyst system comprising a bridged bis-indenyl transitional metal compound and a non-coordinating anion (NCA) activator. The bridged bis-indenyl transitional metal compound comprises a cyclopentadienyl (Cp) complex having two ring systems for ligands; wherein these Cp complexes have the general formula: $(Cp^1R^1{}_m)R^3(Cp^2R^2{}_p)MX_q$; wherein $Cp^1$ of ligand $(Cp^1R^1{}_m)$ and $Cp^1$ of ligand $(Cp^2R^2{}_p)$ are the same, $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 1 to 5, p is 1 to 5, and two $R^1$ and/or $R^2$ substituents on adjacent carbon atoms of the cyclopentadienyl ring associated therewith can be joined together to form a ring containing from 4 to about 20 carbon atoms; $R^3$ is a bridging group, such that the number of atoms in the direct chain between the two ligands is 1 to 8, M is a transition metal having a valence of from 3 to 6, from group 4, 5, or 6 of the periodic table of the elements and is in its highest oxidation state, each X is a non-Cp ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2. Examples of suitable transition metal compounds include ethylenebis (indenyl) zirconium dichloride, ethylenebis (tetrahydroindenyl) zirconium dichloride, ethylenebis (indenyl) dimethylzirconium and their hafnium and titanium counterparts.

According to the invention, it has now been found that gel formation in the production of ethylene elastomer compositions using dienes, such as VNB, can be minimized using a metallocene catalyst system comprising a particular bridged, substituted bis-indenyl transitional metal compound and a non-coordinating anion (NCA) activator. The use of this catalyst system allows the production of a wide variety of elastomer compositions, including the semi-crystalline, propylene-rich compositions described above, and also allows higher diene loadings as compared with those normally possible with Ziegler-Natta catalysts. In addition, it is found that the gel suppression characteristics of the catalyst system may be retained even when the catalyst contains substantial amounts of a second transitional metal compound which is known to be a facile and low cost producer of ethylene elastomers because of its high reaction temperature capabilities but which is also known to be potent gel producer in the presence of VNB. Adjusting the ratio of the two catalysts also allows for control of long chain branching over a wide range from linear to gel point.

SUMMARY

Accordingly, the invention resides in a process for producing an elastomer composition, the process comprising: contacting a catalyst system comprising at least one metallocene catalyst compound and a non-coordinating anion activator with a monomer mixture comprising ethylene, at least one alpha-olefin, and at least one diene; wherein said at least one metallocene catalyst compound comprises an indenyl (In) complex having the general formula: $(In^1R^1{}_m)R^3(In^2R^2{}_p)MX_q$; wherein the or each $R^1$ is a substituent of the indenyl ring $In^1$ and the or each $R^2$ is a substituent of the indenyl ring $In^2$, each $R^1$ and $R^2$ is, independently, a halogen or a hydrocarbyl, halocarbyl, hydrocarbyl-substituted organometalloid or halocarbyl-substituted organometalloid group containing up to about 20 carbon atoms, and at least one $R^1$ or $R^2$ substituent is bonded to the 2-position or the 4-position of its associated indenyl ring; m is 1 to 6; p is 1 to 6; $R^3$ is a bridging group, such that the number of atoms in the direct chain between the $(In^1R^1{}_m)$ ligand and the $(In^2R^2{}_p)$ ligand is 1 to 8, M is a transition metal from Group 3, 4, 5 or 6 of the Periodic Table of the Elements, or an actinide or lanthanide metal; q is equal to the valence of M minus 2; and each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that two X groups may be joined and bound to the metal atom to form a metallacycle ring containing from about 3 to about 20 carbon atoms; or two X groups together can be an olefin, diolefin or aryne ligand.

Conveniently, each $R^1$ and $R^2$ substituent is bonded to the 2-position or the 4-position of its associated indenyl ring; m is 1 or 2; and p is 1 or 2. Conveniently, each $R^1$ and $R^2$ substituent is a hydrocarbyl group, such as a methyl or phenyl group.

Conveniently, $R^3$ is a bridging group containing a Group 13, 14, 15, or 16 element and is, for example, selected from —SiR$^4_2$—, —CR$^4_2$—, and —CR$^4_2$—CR$^4_2$—; wherein each $R^4$, independently, is selected from hydrogen, alkyl, aryl, silyl, halogeneated alkyl, halogenated aryl, and mixtures thereof.

Conveniently, said at least one metallocene catalyst compound comprises at least one of rac-(dimethylsilyl)bis(2-methyl-4-phenylindenyl)zirconium dichloride and rac-(dimethylsilyl)bis(2-methyl-4-phenylindenyl)hafnium dichloride.

In one embodiment, the catalyst system comprises a further metallocene catalyst compound having the general formula:

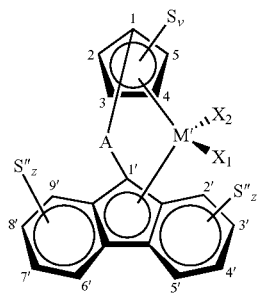

wherein
M' is a Group 3, 4, 5 or 6 transition metal atom, or a lanthanide metal atom, or actinide metal atom;
each substituent group S is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S groups may joined to form a $C_4$ to $C_{20}$ ring to give a saturated or unsaturated polycyclic ligand;
the subscript "v" denotes the carbon atom on the cyclopentadienyl ring to which the substituent is bonded and where there can be zero to four substituents, S, on the cyclopentadienyl ring;
each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand;
subscript "z" denotes the carbon atom on the fluorenyl ring to which the substituent is bonded and where there can be zero to seven substituents, S", on the fluorenyl ring; and
A is a bridging group; and
each of $X_1$ and $X_2$ is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that $X_1$ and $X_2$ may be joined and bound to the metal atom to form a metallacycle ring containing from about 3 to about 20 carbon atoms; or $X_1$ and $X_2$ together can be an olefin, diolefin or aryne ligand.

In another embodiment, the catalyst system comprises yet a further metallocene catalyst compound having the general formula: $(In^3)Y(In^4)M''X'_n$; wherein each of $In^3$ and $In^4$ is an unsubstituted the indenyl ring; Y is a bridging group, such that the number of atoms in the direct chain between the $In^3$ ligand and the $In^4$ ligand is 1 to 8, M" is a transition metal from Group 3, 4, 5 or 6 of the Periodic Table of the Elements, or an actinide or lanthanide metal; n is equal to the valence of M" minus 2; and each X' is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that two X' groups may be joined and bound to the metal atom to form a metallacycle ring containing from about 3 to about 20 carbon atoms; or two X' groups together can be an olefin, diolefin or aryne ligand.

DETAILED DESCRIPTION

As used herein, the numbering scheme for the Periodic Table Groups is the new notation as set out in CHEMICAL AND ENGINEERING NEWS, 63 (5), 27 (1985).

The present invention provides a process for producing an elastomer composition by copolymerizing ethylene with at least one alpha olefin and at least one diene in the presence of a particular metallocene catalyst system that allows the polymerization to proceed with little or no gel formation. As used herein the term "gel" is intended to mean the macrogel produced when polymerization proceeds beyond the gel point, the gel fraction phase separates and the sol fraction continues to polymerize in solution. Preventing such gel formation is important in commercial polymerization reactors since it can lead to unusable product and catastrophic plugging of the reactor and down stream equipment.

Monomers

In addition to ethylene, the monomers employed in the present process include at least one alpha olefin and at least one diene so that the resultant polymer is unsaturated and capable of being cured. Conveniently, the alpha olefin comprises one or more $C_3$ to $C_8$ alpha olefins, such as propylene or butene, typically propylene. The diene is conveniently selected from the group consisting of: 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), ethylidene norbornene (ENB), and combinations thereof, generally VNB.

In some cases, it may be desirable to increase sulfur curable unsaturation along the polymer chain by including ENB as well as VNB in the monomer mixture. Generally, to impart sulfur curability, from about 0.5 to about 10 wt % ENB (based on the total weight of the monomer mixture) is added to the reactor.

Process for Producing the Elastomer

Any known polymerization process may be used to produce the present elastomer composition. Suitable polymerization methods include high pressure, slurry, gas, bulk, suspension, supercritical, or solution phase, or a combination thereof. Similarly, the polymerization conditions are not closely controlled but generally include a temperature range of about 20 to about 200° C., a pressure of about 50 to about 2000 psi (about 350 to 14000 kPa) and residence time of about 5 to about 15 minutes.

The polymerization is conducted in the presence of a catalyst system comprising at least one metallocene catalyst compound and a non-coordinating anion activator. The at least one metallocene catalyst compound comprises an indenyl (In) complex having the general formula (I):

$$(In^1R^1{}_m)R^3(In^2R^2{}_p)MX_q$$

wherein the or each $R^1$ is a substituent of the indenyl ring $In^1$ and the or each $R^2$ is a substituent of the indenyl ring $In^2$, each $R^1$ and $R^2$ is, independently, a halogen or a hydrocarbyl, halocarbyl, hydrocarbyl-substituted organometalloid or halocarbyl-substituted organometalloid group containing up to about 20 carbon atoms, and at least one $R^1$ or $R^2$ substituent is bonded to the 2-position or the 4-position of its associated indenyl ring; m is 1 to 6; p is 1 to 6; $R^3$ is a bridging group, such that the number of atoms in the direct chain between the $(In^1R^1_m)$ ligand and the $(In^2R^2_p)$ ligand is 1 to 8, M is a transition metal from Group 3, 4, 5 or 6 of the Periodic Table of the Elements, or an actinide or lanthanide metal atom and is preferably in its highest oxidation state; q is equal to the valence of M minus 2; and each X is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, provided that two X groups may be joined and bound to the metal atom to form a metallacycle ring containing from about 3 to about 20 carbon atoms; or two X groups together can be an olefin, diolefin or aryne ligand, and provided further that each X is not a substituted or unsubstituted cyclopentadienyl ring.

Conveniently, each $R^1$ and $R^2$ substituent is a hydrocarbyl group, such as a methyl or phenyl group, and is bonded to the 2-position or the 4-position of its associated indenyl ring. Typically m is 1 or 2, especially 2; and p is 1 or 2, especially 2. Conveniently, $In^1$ of the ligand $(In^1R^1_m)$ and $In^2$ of ligand $(In^2R^2_p)$ are the same and typically the entire ligands $(In^1R^1_m)$ and $(In^2R^2_p)$ are the same so that the compound of formula (I) is a bridged bisindenyl compound.

Conveniently, $R^3$ is a bridging group containing a Group 13, 14, 15, or 16 element and particularly an element selected from boron, sulfur, oxygen, nitrogen, phosphorus, carbon, silicon, germanium and selenium. In one embodiment $R^3$ is selected from $-SiR^4_2-$, $-CR^4_2-$, and $-CR^4_2-CR^4_2-$; wherein $R^4$, independently, is selected from hydrogen, alkyl, aryl, silyl, halogenated alkyl, halogenated aryl, and mixtures thereof. Typically $R^3$ is $-Si(CH_3)_2$.

In one embodiment, the compound of formula (I) comprises at least one of rac-(dimethylsilyl)bis(2-methyl-4-phenylindenyl)zirconium dimethyl and rac-(dimethylsilyl)bis(2-methyl-4-phenylindenyl)hafnium dimethyl.

In addition to the metallocene compound of formula (I), the catalyst system employed in the present process conveniently comprises at least one further metallocene catalyst compound having the general formula (II):

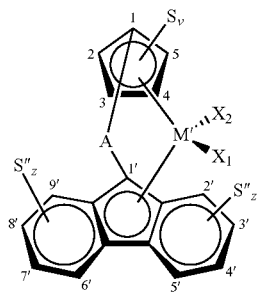

wherein
M' is a Group 3, 4, 5 or 6 transition metal atom, or a lanthanide metal atom, or actinide metal atom;
each substituent group S is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S groups may joined to form a $C_4$ to $C_{20}$ ring to give a saturated or unsaturated polycyclic ligand;
the subscript "v" denotes the carbon atom on the cyclopentadienyl ring to which the substituent is bonded and where there can be zero to four substituents, S, on the cyclopentadienyl ring;
each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand;
subscript "z" denotes the carbon atom on the fluorenyl ring to which the substituent is bonded and where there can be zero to seven substituents, S", on the fluorenyl ring; and
A is a bridging group; and
each of $X_1$ and $X_2$ is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that $X_1$ and $X_2$ may be joined and bound to the metal atom to form a metallacycle ring containing from about 3 to about 20 carbon atoms and or $X_1$ and $X_2$ together can be an olefin, diolefin or aryne ligand, and with the further proviso that neither $X_1$ nor $X_2$ is not a substituted or unsubstituted cyclopentadienyl ring.

"Symmetrically substituted" in relation to the S ligands in formula (II) is defined to mean that the cyclopentadienyl ring is substituted in the 2 and 5 positions and/or 3 and 4 positions with S groups that are of approximately of the same steric bulk. Typically the size of these S groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with S groups and be considered symmetric as long as each of the symmetrical pairs are of similar steric bulk. Additionally, two adjacent S groups in the 3 and 4 position may be linked to form a ring provided that the new ring is also symmetrically substituted.

Typically, if present, each $S_v$ is independently chosen such that the metallocene framework has a plane of symmetry containing the metal center and bisecting the Flu- and Cp-rings. The A ligand need not be symmetrical—for example dimethylsilyl or methylphenylsilyl will not affect the stereochemistry of the polymer produced. Because of the distant placement of the S" substituents on the fluorenyl ring, these substitutents need not be symmetrically placed on the fluorenyl ring. Hence, the fluorenyl ring may be substituted with up to 7 substituents that may be the same or different.

Conveniently, A is a bridging group containing a Group 13, 14, 15, or 16 element and particularly an element selected from boron, sulfur, oxygen, nitrogen, phosphorus, carbon, silicon, germanium and selenium. In one embodiment, A is selected from $-SiR^4_2-$, $-CR^4_2-$, and $-CR^4_2-CR^4_2-$; wherein $R^4$, independently, is selected from hydrogen, alkyl, aryl, silyl, halogenated alkyl, halogenated aryl, and mixtures thereof.

Illustrative, but not limiting, examples of suitable unsymmetrical cyclopentadienyl metallocenes of the type described in formula (II) above include:

μ-(C$_6$H$_5$)$_2$ C(cyclopentadienyl)(fluorenyl)M(CH$_3$)$_2$;
μ-(C$_6$H$_5$)$_2$ C(3-methylcyclopentadienyl)(fluorenyl)M(CH$_3$)$_2$;
μ-(CH$_3$)$_2$ C(cyclopentadienyl)(fluorenyl)M(CH$_3$)$_2$; and
μ-(p-triethylsilylphenyl)$_2$ C(cyclopentadienyl)(3,8-di-t-butylfluorenyl)M(CH$_3$)$_2$,
wherein M is Zr or Hf.

In a further embodiment, the catalyst system employed in the present process comprises yet a further metallocene catalyst compound having the general formula (III): (In$^3$)Y(In$^4$)M"X'$_n$; wherein each of In$^3$ and In$^4$ is an unsubstituted indenyl ring; Y is a bridging group, such that the number of atoms in the direct chain between the In$^3$ ligand and the In$^4$ ligand is from 1 to 8, M" is a transition metal from Group 3, 4, 5 or 6 of the Periodic Table of the Elements, or an actinide or lanthanide metal; n is equal to the valence of M" minus 2; and each X' is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that two X' groups may be joined and bound to the metal atom to form a metallacycle ring containing from about 3 to about 20 carbon atoms; or two X' groups together can be an olefin, diolefin or aryne ligand.

Conveniently, Y is a bridging group containing a Group 13, 14, 15, or 16 element and particularly an element selected from boron, sulfur, oxygen, nitrogen, phosphorus, carbon, silicon, germanium and selenium. In one embodiment Y is selected from —SiR$^4$$_2$—, —CR$^4$$_2$—, and —CR$^4$$_2$—CR$^4$$_2$—; wherein R$^4$, independently, is selected from hydrogen, alkyl, aryl, silyl, halogenated alkyl, halogenated aryl, and mixtures thereof. Typically, Y is —Si(CH$_3$)$_2$.

In one embodiment, the compound of formula (III) comprises at least one of rac-(dimethylsilyl)bisindenylzirconium dimethyl and rac-(dimethylsilyl)bisindenylhafnium dimethyl.

The catalyst system employed in the present process can comprise a mixture of the metallocene compound of formula (I) with the metallocene compound of formula (II) alone, or with the metallocene compound of formula (III) alone or with a combination of the metallocene compounds (II) and (III)

Typically, the weight ratio of the compound of formula (II) and/or the compound of formula (III) to the compound of formula (I) in the catalyst system used in the present process is between 0 and about 0.9.

In addition to the metallocene component(s), the catalyst system employed in the present process comprises a non-coordinating anion (NCA) activator. As used herein, the term "non-coordinating anion" means an anion that does not coordinate to a transition metal cation thereby remaining sufficiently labile to be displaced by a neutral Lewis base. "Compatible" NCAs are those which are not degraded to neutrality when the initially formed complex decomposes. Further, the anion will not transfer an anionic substituent or fragment to the cation so as to cause it to form a neutral four coordinate metallocene compound and a neutral by-product from the anion. NCAs are preferably those which are compatible and stabilize the metallocene cation in the sense of balancing its ionic charge, yet retain sufficient lability to permit displacement by an ethylenically or acetylenically unsaturated monomer during polymerization. Additionally, the anions used are typically large or bulky in the sense of having sufficient molecular size to inhibit or prevent neutralization of the metallocene cation by Lewis bases other than the polymerizable monomers that may be present in the polymerization process. Typically, the anion will have a molecular size of greater than or equal to about 4 angstroms. NCA-generating activators of the type described in EP277004 are particularly useful in the present process.

In one embodiment, the non-coordinating anion activator may be represented by the following formula:

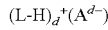

$$(L-H)_d^+ (A^{d-})$$

wherein
L is an neutral Lewis base;
H is hydrogen;
(L-H)$^+$ is a Bronsted acid;
A$^{d-}$ is a non-coordinating anion having the charge d–; and
d is an integer from 1 to 3.

The cation component, (L-H)$_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component A$^{d-}$ includes those having the formula [M$^{k+}$Q$_n$]$^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a perfluorinated aryl group, especially a perfluoronaphthyl group and/or a perfluorophenyl group. Examples of suitable A$^{d-}$ also include diboron compounds as disclosed in U.S. Pat. No. 5,447,895, which is fully incorporated herein by reference.

Illustrative, but not limiting, examples of suitable activators include N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, and triphenylcarbenium tetra(perfluorophenyl)borate.

The elastomer composition produced by the present process is substantially free from gel, by which is meant at least 80%, typically 100%, by weight of the polymerization product can be dissolved in a hydrocarbon solvent such as cyclohexane, typically used to dissolve EPDM. When gel is present in the polymer or if the molecular weight is very high (>125 ML), this portion will remain undissolved even at elevated temperatures.

Elastomer Composition

The overall composition of the elastomer produced by the present process can vary over a broad range. Typically, the elastomer contains from about 5 wt % to about 85 wt %, such as from about 20 wt % to about 80 wt %, for example from about 40 wt % to about 80 wt %, of ethylene-derived units; from about 15 wt % to about 95 wt %, for example from about 20 wt % to about 80 wt %, such as from about 20 wt % to about 60 wt %, of units derived from one or more C$_3$ to C$_8$ alpha olefins; and from about 0.3 to about 10 wt %, such as from about 0.3 to about 3 wt % of one or more diene-derived units. In one embodiment, the elastomer composition comprises from about 5 to about 25% by weight of ethylene-derived units, about 75 to about 95% by weight of propylene-derived units and about 0.3 to about 10 wt % of one or more diene-derived units.

The ethylene content of the elastomer is conveniently determined by ASTM D3900, and is not corrected for diene content. VNB content incorporated in the polymer can be determined by H NMR, whereas ENB content can determined by FTIR using ASTM D6047. However, these methods measure available unsaturation and hence the measured incorporation may be lower than the actual incorporation because dienes having pendant unsaturated moieties converted by e.g., hydrogen are not detected in the measurement. If both ENB and VNB are present, $^{13}$C NMR is preferably used to determine diene content.

The relative degree of branching in the elastomer composition produced by the present process is determined using a branching index factor (BI). Calculating this factor requires a series of three laboratory measurements of polymer properties in solutions as disclosed in VerStrate, Gary, "Ethylene-Propylene Elastomers", Encyclopedia of Polymer Science and Engineering, 6, $2^{nd}$ edition (1986). These are: (i) $M_{w, GPC\ LALLS}$, weight average molecular weight measured using a low angle laser light scattering (LALLS) technique in combination with Gel Permeation Chromatography (GPC), (ii) weight average molecular weight ($Mw_{DRI}$) and viscosity average molecular weight ($Mv_{DRI}$) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in 1,2,4-trichlorobenzene.

The branching index (BI) is defined as:

$$BI = \frac{M_{v,br} \times M_{w,DRI}}{M_{w,GPC\ LALLS} \times M_{v,GPC\ DRI}}$$

where, $M_{v,br}=(IV/k)^{1/a}$; and "k" and "a" are the Mark-Houwink constants (a=0.759 and k=0.000246 for ethylene, propylene diene elastomeric polymers in decalin at 135° C.). From this equation it follows that the branching index for a linear polymer is 1.0. For branched polymers, the extent of branching is defined relative to the linear polymer. Since at a constant number average molecular weight $M_n$, $(M_W)_{branch} > (M_W)_{linear}$, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, "k" and "a" values appropriate for the GPC solvent should be used in the equation above.

Typically, the elastomer composition produced by the present process has a branching index (BI) of from about 0.1 to about 1.0, such as from about 0.3 to about 0.9.

In addition, the elastomer composition produced by the present process typically has a molecular weight distribution (MWD), defined as the ratio of the weight average molecular weight (Mw) to the number average molecular weight (Mn), of from about 2 to about 20.

Additives

As will be evident to those skilled in the art, the present elastomer compositions may comprise other additives in addition to the polymer components. Various additives may be present to enhance a specific property or may be present as a result of processing of the individual components. Additives which may be incorporated include, but are not limited to, processing oils, fire retardants, antioxidants, plasticizers, pigments, vulcanizing or curative agents, vulcanizing or curative accelerators, cure retarders, processing aids, flame retardants, tackifying resins, and flow improvers. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention. Those of skill in the art will appreciate that other additives may be employed to enhance properties of the composition.

The compositions described herein may also contain inorganic particulate fillers, which may improve the mechanical and wear properties of the compositions, particularly in compositions including cured components. The amount of inorganic filler used is typically from 1 to 100 parts by weight of inorganic filler per 100 parts of polymer. The inorganic fillers include particles less than 1 mm in diameter, rods less than 1 cm in length, and plates less than 0.2 cm$^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An example of a plate-like filler is mica. The addition of very small particulate fibers, commonly referred to as nanocomposites, is also contemplated. The addition of the fillers may change the properties of the compositions described herein. For example, compositions including inorganic filler may have improved thermal stability and resistance to wear. The addition of white fillers may improve the temperature changes of the hydrocarbon polymers on exposure to sunlight. The addition of fillers beyond a certain level may lead to a dramatic increase in the viscosity and a corresponding decrease in processability. This threshold level is referred to as the percolation threshold. In addition to the increase in viscosity, the percolation threshold is accompanied by an improvement in the elastic properties, and at levels slightly higher than the percolation threshold there is a drop in the elastic recovery of the blend. The percolation threshold is attained at different levels of addition of fillers depending on the type of filler used. Generally, the percolation threshold is attained at lower levels for fillers with a smaller size than for fillers with a larger size.

The compositions described herein may contain process oil in the range of from 0 to 500 parts by weight, or from 2 to 200 parts by weight, or from 5 to 150 parts by weight, or from 10 to 100 parts by weight, per 100 parts of polymer. The addition of process oil in moderate amounts may lower the viscosity and flexibility of the blend while improving the properties of the blend at temperatures near and below 0° C. It is believed that these potential benefits arise by the lowering of the glass transition temperature (Tg) of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight (Mn) less than 10,000. Combinations of process oils may also be used in the practice of the invention. The process oil should be compatible or miscible with the polymer blend composition in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 phr.

Adding antioxidants to the compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 phr.

Cured Products

The elastomer compositions described herein may be cured or vulcanized according to known methods, for example using curing agents, such as peroxide that forms a C—O—C bond or hydrosilation that forms a C—Si—C bond as is described in "Vulcanization", Chapter 7 of "Science and Technology of Rubber", by A. Y. Coran, (F. R Eirich, editor) Academic Press Inc., 1978.

Cured compositions may be prepared by any procedure that guarantees an intimate mixture of the polymeric components. Generally, the first step of the process is mixing the polymeric components and optional additives, such as process oil, fillers, colorants, antioxidants, nucleators, and flow improvers using equipment such as, but not limited to, a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components in intimate contact. A complete mixture of the polymeric components is indicated by the uniformity of the morphology of the composition. Such procedures are well known to those of ordinary skill in the art. In one embodiment, the next step is mixing a chemical curative, such as peroxides or sulfur compounds, with the intimate mixture, and then fabricating the intimate mixture including the chemical curative into the final shape of the article and raising the temperature for an extended period of time to allow the curing of the propylene-based elastomer. In another embodiment, the next step is fabricating the intimate mixture into the final shape of the article, and then exposing the fabricated mixture to an external curative agent, such as high energy radiation, to allow curing of the propylene-based elastomer.

Uses of the Elastomer Composition

The present elastomer composition can be used to produce fibers, films, and molded objects and can be also used in a variety of peroxide-cured applications such as weather seals, coolant hoses, roofing membranes, wire and cable insulations, dynamically vulcanized alloys, power transmission belts, engine mounts, thermoplastic olefin blends and the like.

The invention will now be more particularly described with reference to the following non-limiting examples.

In the examples, metallocene polymerizations were carried out in a continuous flow stirred tank reactor (CSTR). In each case, monomers comprising ethylene, propylene and, where applicable, vinyl norbornene (VNB) were mixed with a solvent (hexane) and delivered to the reactor as a mixed feed stream. The catalyst and activator were pre-mixed in 900 cc of toluene and delivered to the reactors with a metering pump. The production rate was measured by timed collection of a known weight of effluent and measuring the solids concentration by evaporating the solvent. From the catalyst make-up and feed rate and the production rate, the catalyst productivity was calculated as Catalyst Efficiency (g polymer/g catalyst). The molecular weight was controlled through the choice of reactor temperature, although a chain transfer agent, such as hydrogen, can also be used to facilitate molecular weight control. At the completion of the polymerization run, the reactor was opened and inspected for gel. In all runs, except for Comparative Example 4, the product was found to be gel free. The process data and the polymer data for the inventive examples are shown in Tables 1A and 2A, respectively, and the process data and the polymer data for the comparative examples are shown in Tables 1B and 2B, respectively.

Molecular weights (number average molecular weight (Mn), weight average molecular weight (Mw), and z-average molecular weight (Mz)) were determined using a Waters 150 Size Exclusion Chromatograph (SEC) equipped with a differential refractive index (DRI) detector, an online low angle light scattering (LALLS) detector and a viscometer (VIS). The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160°

C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Mooney Viscosity, ML (1+4) at 125° C., was measured according to ASTM D 1646.

Melt Index (MI) and Melt Index Ratio (MIR), where MIR=MI/MFR and MFR is the melt flow rate, were measured according to ASTM D 1238 E and F. MIR is generally a function of both MW and molecular weight distribution (MWD). At a given MI, a higher MIR would typically imply a higher level of long chain branching.

Mooney Relaxation Area (MLRA) is determined using ASTM D 1646.

Examples 1 to 5 and Comparative Example 2

In Examples 1 to 5, various mixtures of ethylene, propylene and vinyl norbornene (VNB) were polymerized using as the catalyst rac-dimethylsilylbis(2-methyl-4-phenylindenyl)zirconiumdimethyl (Catalyst A) activated with N,N-dimethylanilinium tetrakis(perfluoronapthyl)borate. A similar procedure was followed in Comparative Example 2 except the VNB was omitted from the monomer mixture.

As shown in Tables 1 and 2, inventive Examples 1 to 5 utilizing VNB as the diene produced an elastomer having branching levels very similar to that of Comparative Example 2 prepared without a diene, but otherwise prepared under substantially the same conditions as Examples 1 to 5. Examples 1 to 3 are repeats using similar process conditions and the results are substantially similar. Thus, the results of the present process are reproducible. Comparing the results of Examples 3 and 4, the polymer composition has large influence on VNB incorporation in the polymer backbone. Comparing Examples 4 and 5, the reactor temperature has a large effect on catalyst productivity. In addition, Example 5 illustrates that the low levels of long chain branching can be preserved even at substantial VNB content in the polymer. The ability to incorporate such high levels of VNB without substantial introduction of branching has tremendous commercial importance in applications that demand high cure state and physical properties such as tear resistance in preference to processability benefits derived from having substantial levels of long chain branching.

Example 6 and Comparative Examples 1, 3 and 4

In Example 6, a polymerization process similar to that of Example 1 was conducted with a catalyst comprising a mixture of:

(1) 16 wt % of rac-dimethylsilylbis(2-methyl-4-phenylindenyl)zirconium dimethyl (Catalyst A), and (2) 84 wt % of di(para-triethylsilyl)methylene(2,7-ditertiarybutylfluorenyl) (cyclopentadienyl)hafnium dimethyl (Catalyst B)

activated with N,N-dimethylanilinium tetrakis(perfluoronapthyl)borate. Similar procedures were followed in Comparative Examples 3 and 4 except the VNB was omitted from the monomer mixture in Comparative Example 3, whereas in Comparative Example 4 the catalyst was 100 wt % di(para-triethylsilyl)methylene(2,7-ditertiarybutylfluorenyl)(cyclopentadienyl)hafnium dimethyl (Catalyst B).

Comparative Example 4 was prepared with catalyst B alone and with the same feed rate of VNB to the reactor as in inventive Example 6 and resulted in complete gellation of the reactor. In contrast, in inventive Example 6 it will be seen that there was no macrogel formation under identical process conditions when a mixed catalyst feed (comprising 16 wt % catalyst A and 84 wt % catalyst B) was used in place of catalyst B alone. Example 6 demonstrates that catalyst A acts as a gel suppressant when used in combination with Catalyst B.

Comparing the results of Example 6 with those of Comparative Example 3, it will be seen the polymer of Example 6, though gel-free, is very substantially branched. In fact, comparing the elastomer of Example 6 with that of Comparative Example 1, which is a commercial EPDM produced by Ziegler Natta catalysis and sold by ExxonMobil Chemical Co under the name V-1703P for use in wire and cable applications, both polymers have similar branching levels. V-1703P originates in the Z-N process as rubber bales which is subsequently converted to pellet form by a toll processor at additional cost. Thus, the process of Example 6 would allow the production of V-1703P directly as pellets in a metallocene plant with pelletization facilities built-in, thus saving the additional pelletization cost.

Examples 7 to 11

In Examples 7 to 11, various mixtures of ethylene, propylene and vinyl norbornene (VNB) were polymerized using catalysts comprising:

(1) 15 to 71 wt % of rac-dimethylsilylbis(2-methyl-4-phenylindenyl)zirconium dimethyl (Catalyst A), and (2) 85 to 29 wt % of rac-dimethylsilyl(bisindenyl)zirconium dimethyl (Catalyst C)

activated with N,N-dimethylanilinium tetrakis(perfluoronapthyl)borate.

Inventive Examples 7-11 demonstrate that catalyst A acts as a gel suppressant in combination with Catalyst C. These polymers were not only gel-free, but by adjusting the ratio of the catalysts A and C, the long chain branching level can be adjusted at will. This ability allows the production of polymers with very wide latitude in properties, as needed for the specific application for which the polymer is made. The VNB level in examples 7-10 is substantial.

Examples 12 to 15

In Examples 12 to 15, catalyst A alone was used to polymerize mixtures of ethylene, propylene and vinyl norbornene (VNB) having significantly lower levels of ethylene than in Examples 1 to 5 so that the polymer compositions possessed propylene sequences with isotactic propylene crystallinity. As shown in Tables 1 and 2, inventive Examples 12-15 utilizing VNB as the diene produced an elastomer having branching levels very similar to that of Comparative Example 2 prepared without a diene. Thus, the present process as it relates to the ability of Catalyst A to produce VNB polymers without substantial long chain branching is valid across the entire ethylene composition range, comprising those with and without propylene crystallinity. Examples 12-15 also show that the reactor temperature has a large effect on catalyst productivity.

Comparative Example 5 was conducted with catalyst C alone in a larger sized reactor of the same design used in the preparation of the inventive examples and it is included for illustrative purposes. It shows that with Catalyst C, even low levels of VNB incorporation lead to substantial levels of long chain branching. Like Catalyst B, catalyst C is expected to lead to gellation at higher levels of VNB Thus, the use of catalyst A in place of catalyst C produces a substantially linear molecule in the presence of VNB without the production of macrogel.

While the present invention has been described and illustrated by reference to particular embodiments, those of ordinary skill in the art will appreciate that the invention lends itself to variations not necessarily illustrated herein. For this reason, then, reference should be made to the appended claims for purposes of determining the true scope of the present invention.

TABLE 1A

| Example | Total Cat rate (g/h) | Wt % Cat A | Wt % Cat B or C | Alkyl rate (g/h) | C2 rate (g/h) | C3 rate (g/h) | VNB rate (g/h) | C6 Rate (g/h) | T (°C.) | Prod. Rate (g/h) | C2 Conv | C3 Conv | VNB Conv | Cat Eff (g/g) | Cem Conc (%) |
|---|---|---|---|---|---|---|---|---|---|---|---|---|---|---|---|
| 1 | 0.002 | 100 | 0 | 0.12 | 180 | 346 | 11 | 3564 | 115 | 179 | 57% | 22% | 13% | 85688 | 4.4 |
| 2 | 0.002 | 100 | 0 | 0.12 | 180 | 356 | 11 | 3564 | 115 | 215 | 68% | 26% | 12% | 102790 | 5.2 |
| 3 | 0.002 | 100 | 0 | 0.12 | 180 | 338 | 11 | 3564 | 115 | 238 | 68% | 34% | 17% | 113523 | 5.8 |
| 4 | 0.002 | 100 | 0 | 0.12 | 330 | 212 | 17 | 3564 | 115 | 248 | 61% | 22% | 5% | 117914 | 6.1 |
| 5 | 0.021 | 100 | 0 | 0.12 | 300 | 440 | 30 | 3564 | 60 | 86 | 19% | 7% | 5% | 4105 | 2.0 |
| 6 | 0.013 | 16 | 84(B) | 0.12 | 180 | 339 | 11 | 3564 | 113 | 277 | 75% | 42% | 20% | 21120 | 6.8 |
| 7 | 0.014 | 15 | 85(C) | 0.12 | 42 | 589 | 11 | 3564 | 45 | 111 | 39% | 16% | 17% | 8096 | 2.6 |
| 8 | 0.012 | 25 | 75(C) | 0.12 | 42 | 582 | 10 | 3564 | 45 | 92 | 35% | 13% | 14% | 7356 | 2.2 |
| 9 | 0.012 | 43 | 57(C) | 0.12 | 42 | 631 | 12 | 3564 | 45 | 85 | 40% | 11% | 16% | 6989 | 2.0 |
| 10 | 0.012 | 61 | 39(C) | 0.12 | 42 | 653 | 12 | 3564 | 45 | 65 | 30% | 8% | 10% | 5331 | 1.5 |
| 11 | 0.029 | 71 | 29(C) | 0.12 | 17 | 469 | 5 | 3564 | 60 | 86 | 44% | 17% | 18% | 2939 | 2.2 |
| 12 | 0.052 | 100 | 0 | 0.12 | 17 | 250 | 3 | 3564 | 60 | 62 | 48% | 21% | 5% | 1194 | 1.6 |
| 13 | 0.034 | 100 | 0 | 0.12 | 17 | 272 | 3 | 3564 | 80 | 175 | 118% | 57% | 27% | 5095 | 4.5 |
| 14 | 0.004 | 100 | 0 | 0.12 | 60 | 720 | 16 | 3564 | 100 | 116 | 48% | 12% | 8% | 27918 | 2.7 |
| 15 | 0.006 | 100 | 0 | 0.12 | 60 | 720 | 11 | 3564 | 115 | 315 | 73% | 38% | 33% | 50307 | 7.2% |

TABLE 1B

| Comp. Example | Total Cat rate (g/h) | Wt % Cat A | Wt % Cat B or C | Alkyl rate (g/h) | C2 rate (g/h) | C3 rate (g/h) | VNB rate (g/h) | C6 Rate (g/h) | T (°C.) | Prod. Rate (g/h) | C2 Conv | C3 Conv | VNB Conv | Cat Eff (g/g) | Cem Conc (%) |
|---|---|---|---|---|---|---|---|---|---|---|---|---|---|---|---|
| 1 | | | | | | | | | | | | | | | |
| 2 | 0.002 | 100 | 0 | 0.12 | 180 | 356 | 0 | 3564 | 115 | 410 | 95% | 67% | | 196329 | 10.0 |
| 3 | 0.013 | 16 | 84(B) | 0.12 | 180 | 340 | 0 | 3564 | 115 | 338 | 85% | 54% | | 25810 | 8.3 |
| 4 | 0.011 | 0 | 100(B) | 0.12 | 180 | 339 | 11 | 3564 | 115 | | | | | | |
| 5 | 0.141 | 0 | 100(C) | 3.13 | 820 | 1298 | 43 | 31640 | 38 | 2511 | 79% | 56% | 34% | 17795 | 7 |

TABLE 2A

| Example | Wt % C2 | Wt % VNB | MI | MFR | HL MI | HL MFR | MIR | ML (1 + 4) 125° C. | MLRA | Mw, Lalls | Mz, Lalls | Mw, Dri | Mn, Dri | BI | Mw, Lalls/ Mn, DRI | Mz, Lalls/ Mw, Lalls |
|---|---|---|---|---|---|---|---|---|---|---|---|---|---|---|---|---|
| 1 | 58.0 | 0.79 | 4.7 | | | | 33.1 | | | 86442 | 154252 | 81333 | 36029 | 0.79 | 2.4 | 1.8 |
| 2 | 57.3 | 0.6 | 8.3 | | | | 35.0 | | | 73632 | 139690 | 74239 | 32280 | 0.83 | 2.3 | 1.9 |
| 3 | 51.6 | 0.78 | 17.8 | | | | | 2.7 | | 66740 | 126910 | 57879 | 25631 | 0.75 | 2.6 | 1.9 |
| 4 | 81.2 | 0.3 | | | | | | 43.3 | 433.8 | 188629 | 617065 | 136278 | 45665 | 0.62 | 4.1 | 3.3 |
| 5 | 65.5 | 1.50 | | | | | | 26.2 | 167 | 147942 | 420308 | 119452 | 43365 | 0.72 | 3.4 | 2.8 |
| 6 | 49.1 | 0.8 | | | | | | 48.5 | 1275.9 | 462430 | 2816276 | 213047 | 30596 | 0.32 | 15.1 | 6.1 |
| 7 | 14.9 | 1.62 | | | 2.71 | 6.38 | | 52.4 | 924.1 | 713491 | 2963968 | 415811 | 117358 | 0.49 | 6.1 | 4.2 |
| 8 | 16.1 | 1.61 | | | 5.18 | 15.47 | | 44.1 | 604.9 | 437151 | 1377414 | 352313 | 95146 | 0.63 | 4.6 | 3.2 |
| 9 | 19.6 | 2.21 | | | | | | 39.1 | 490.3 | 436852 | 1278340 | 317355 | 88843 | .60 | 4.9 | 2.9 |
| 10 | 19.3 | 1.79 | | | | | | 34.7 | 286.4 | 345304 | 931919 | 266487 | 69627 | .69 | 5.0 | 2.7 |
| 11 | 8.6 | 1.02 | | | | | | 25 | 180 | 280184 | 583038 | 239062 | 103391 | 0.83 | 2.7 | 2.1 |
| 12 | 13.1 | 0.19 | 146.3 | | | | | | | 92634 | 146704 | 83338 | 35912 | 0.88 | 2.6 | 1.6 |
| 13 | 11.5 | 0.38 | | | | | | | | 65346 | 112719 | 60175 | 29058 | 0.77 | 2.2 | 1.7 |
| 14 | 22.8 | 1.16 | 168 | | | | | | | 75531 | 119550 | 75348 | 33268 | 0.80 | 2.3 | 1.6 |
| 15 | 13.9 | 1.16 | 279 | | | | | | | 45876 | 78366 | 49754 | 22072 | 0.79 | 2.1 | 1.7 |

TABLE 2B

| Comp. Example | Wt % C2 | Wt % VNB | MI | MFR | HL MI | HL MFR | MIR | ML (1+4) 125° C. | MLRA | Mw, Lalls | Mz, Lalls | Mw, Dri | Mn, Dri | BI | Mw, Lalls/ Mn, DRI | Mz, Lalls/ Mw, Lalls |
|---|---|---|---|---|---|---|---|---|---|---|---|---|---|---|---|---|
| 1 | 76.5 | 0.9 | 0.12 | | | | 167 | 23 | 275 | 291500 | 6850250 | 126000 | 22300 | 0.39 | 13.1 | 23.5 |
| 2 | 41.7 | 0 | | | | | | | | 46586 | 92698 | 42761 | 15372 | 0.68 | 3.03 | 1.99 |
| 3 | 45.4 | 0 | | | | | | | | 47153 | 86852 | 43654 | 18746 | 0.71 | 2.52 | 1.84 |
| 4 | Gelled | | | | | | | | | | | | | | | |
| 5 | 8.3 | 0.4 | | | | | | 26.7 | 211 | 424600 | 1019040 | 311400 | 131300 | 0.42 | 3.2 | 2.4 |

What is claimed is:

1. A process for producing an elastomer composition, the process comprising: contacting a catalyst system comprising at least two metallocene catalyst compounds and a non-coordinating anion activator with a monomer mixture comprising ethylene, at least one alpha-olefin, and at least one diene;

wherein at least one metallocene catalyst compound comprises an indenyl (In) complex having the general formula: $(In^1R^1{}_m)R^3(In^2R^2{}_p)MX_q$; wherein the or each $R^1$ is a substituent of the indenyl ring $In^1$ and the or each $R^2$ is a substituent of the indenyl ring $In^2$, each $R^1$ and $R^2$ is, independently, a halogen or a hydrocarbyl, halocarbyl, hydrocarbyl-substituted organometalloid or halocarbyl-substituted organometalloid group containing up to about 20 carbon atoms, and at least one $R^1$ or $R^2$ substituent is bonded to the 2-position or the 4-position of its associated indenyl ring; m is 1 to 6; p is 1 to 6; $R^3$ is a bridging group, such that the number of atoms in the direct chain between the $(In^1R^1{}_m)$ ligand and the $(In^2R^2{}_p)$ ligand is from 1 to 8, M is a transition metal from Group 3, 4, or 5 of the Periodic Table of the Elements; q is equal to the valence of M minus 2; and each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that two X groups may be joined and bound to the metal atom to form a metallacycle ring containing from about 3 to about 20 carbon atoms; or two X groups together can be an olefin, diolefin or aryne ligand; and wherein at least one metallocene catalyst compound comprises a compound having the general formula:

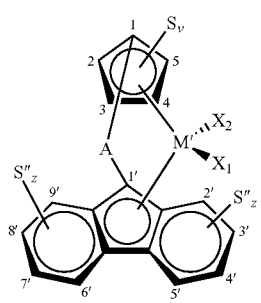

wherein

M' is a Group 3, 4, or 5 transition metal atom;

each substituent group S is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S groups may joined to form a $C_4$ to $C_{20}$ ring to give a saturated or unsaturated polycyclic ligand;

the subscript "v" denotes the carbon atom on the cyclopentadienyl ring to which the substituent is bonded and where there can be zero to four substituents, S, on the cyclopentadienyl ring;

each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand;

subscript "z" denotes the carbon atom on the fluorenyl ring to which the substituent is bonded and where there can be zero to seven substituents, S", on the fluorenyl ring; and A is a bridging group; and each of $X_1$ and $X_2$ is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that $X_1$ and $X_2$ may be joined and bound to the metal atom to form a metallacycle ring containing from about 3 to about 20 carbon atoms; or $X_1$ and $X_2$ together can be an olefin, diolefin or aryne ligand.

2. The process of claim 1 wherein each $R^1$ and $R^2$ substituent is bonded to the 2-position or the 4-position of its associated indenyl ring; m is 1 or 2; and p is 1 or 2.

3. The process of claim 2 wherein m is 2 and p is 2.

4. The process of claim 1 wherein each $R^1$ and $R^2$ substituent is a hydrocarbyl group.

5. The process of claim 1 wherein each $R^1$ and $R^2$ substituent is a methyl or phenyl group.

6. The process of claim 1 wherein $R^3$ is a bridging group containing a Group 13, 14, 15, or 16 element.

7. The process of claim 1 wherein $R^3$ is selected from —$SiR^4{}_2$—, —$CR^4{}_2$—, and —$CR^4{}_2$—$CR^4{}_2$—; wherein $R^4$, independently, is selected from hydrogen, alkyl, aryl, silyl, halogenated alkyl, halogenated aryl, and mixtures thereof.

8. The process of claim 1 wherein $R^3$ is —$SiR^4{}_2$—.

9. The process of claim 1 wherein said at least one metallocene catalyst compound comprises rac-(dimethylsilyl)bis (2-methyl-4-phenylindenyl)zirconium dimethyl or rac-(dimethylsilyl)bis(2-methyl-4-phenylindenyl)hafnium dimethyl.

* * * * *